(12) United States Patent
Wu et al.

(10) Patent No.: US 11,375,125 B2
(45) Date of Patent: Jun. 28, 2022

(54) ELECTRONIC DEVICE

(71) Applicant: ASUSTeK COMPUTER INC., Taipei (TW)

(72) Inventors: I-Hsi Wu, Taipei (TW); Jen-Pang Hsu, Taipei (TW); Kai-Shun Chang, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 16/872,400

(22) Filed: May 12, 2020

(65) Prior Publication Data

US 2020/0366850 A1 Nov. 19, 2020

Related U.S. Application Data

(60) Provisional application No. 62/848,074, filed on May 15, 2019.

(30) Foreign Application Priority Data

Oct. 8, 2019 (TW) ................................ 108136446

(51) Int. Cl.
*H04N 5/232* (2006.01)
*H04N 5/225* (2006.01)

(52) U.S. Cl.
CPC ....... *H04N 5/23299* (2018.08); *H04N 5/2253* (2013.01); *H04N 5/22525* (2018.08); *H04N 5/23238* (2013.01); *H04N 5/232941* (2018.08)

(58) Field of Classification Search
CPC .......... H04N 5/23299; H04N 5/23238; H04N 5/232941; H04N 5/22525; H04N 5/2253; H04N 5/2257; H04N 5/2252; H04N 2007/145; H04M 1/72403; H04M 2250/52; H04M 1/0264
See application file for complete search history.

(56) References Cited

U.S. PATENT DOCUMENTS 6,933,981 B1 8/2005 Kishida et al.
7,627,342 B2 12/2009 Kang
(Continued)

FOREIGN PATENT DOCUMENTS

CN 1633136 A 6/2005
CN 1979322 A 6/2007
(Continued)

*Primary Examiner* — Joseph Suh
(74) *Attorney, Agent, or Firm* — McClure, Qualey & Rodack, LLP

(57) ABSTRACT

An electronic device is provide, which includes a body, an image capture device, a display, a motor, at least two sensors, and a processor. The image capture device is rotatably disposed on the body, for capturing an image. The display is disposed on the body of the first side. The motor is electrically connected to the image capture device, for driving the image capture device to rotate with a flip angle to make the image capture device to be located at a first position, a second position, or a position between the first position and the second position. The two sensors are respectively disposed on the image capture device and the body, for sensing the flip angle of the image capture device. The processor is electrically connected to the image capture device, the display, the motor and the at least two sensors, for controlling the motor.

13 Claims, 4 Drawing Sheets

(56) References Cited

U.S. PATENT DOCUMENTS

| | | | |
|---|---|---|---|
| 7,672,118 B2 | 3/2010 | Yamazato et al. | |
| 7,782,375 B2 | 8/2010 | Chambers et al. | |
| 8,010,154 B2 | 8/2011 | Chambers et al. | |
| 10,291,847 B2 | 5/2019 | Chin et al. | |
| 10,915,163 B2* | 2/2021 | Tzou | G06F 1/1618 |
| 2003/0220145 A1* | 11/2003 | Erickson | A63F 13/235 |
| | | | 463/47 |
| 2005/0024500 A1 | 2/2005 | Katayama | |
| 2005/0110874 A1 | 5/2005 | Song | |
| 2005/0270385 A1* | 12/2005 | Shioya | H04N 5/225251 |
| | | | 348/239 |
| 2007/0041058 A1* | 2/2007 | Disatnik | G06K 9/00355 |
| | | | 358/486 |
| 2007/0132835 A1* | 6/2007 | Kang | H04M 1/0264 |
| | | | 348/14.01 |
| 2012/0123733 A1* | 5/2012 | Lo | A61B 5/11 |
| | | | 702/141 |
| 2014/0118562 A1* | 5/2014 | Bivolarsky | H04N 21/2662 |
| | | | 348/207.1 |
| 2014/0320604 A1* | 10/2014 | Dalvi | H04N 13/289 |
| | | | 348/47 |
| 2014/0354779 A1 | 12/2014 | Dho et al. | |
| 2015/0189175 A1* | 7/2015 | Fan | H04N 5/2251 |
| | | | 348/37 |
| 2015/0370226 A1 | 12/2015 | Kim et al. | |
| 2016/0314818 A1* | 10/2016 | Kirk | G11B 27/10 |
| 2017/0026575 A1* | 1/2017 | Vegh | H04N 5/23203 |
| 2017/0156662 A1* | 6/2017 | Goodall | A61B 5/0036 |
| 2018/0128883 A1* | 5/2018 | Stute | H01L 25/10 |
| 2020/0341515 A1* | 10/2020 | Moser | G06F 1/1643 |

FOREIGN PATENT DOCUMENTS

| | | |
|---|---|---|
| CN | 101634871 A | 1/2010 |
| CN | 102170493 A | 8/2011 |
| CN | 102572031 B | 12/2014 |
| CN | 104255015 A | 12/2014 |
| CN | 104469165 A | 3/2015 |
| CN | 204425471 U | 6/2015 |
| CN | 104954675 A | 9/2015 |
| CN | 105827847 A | 8/2016 |
| CN | 105955779 A | 9/2016 |
| CN | 107333055 A | 11/2017 |
| CN | 107509038 A | 12/2017 |
| CN | 107671862 A | 2/2018 |
| CN | 104954676 B | 3/2018 |
| CN | 107819907 A | 3/2018 |
| CN | 107872582 A | 4/2018 |
| CN | 207530941 U | 6/2018 |
| CN | 104301609 B | 9/2018 |
| CN | 108495039 A | 9/2018 |
| CN | 108509782 A | 9/2018 |
| CN | 108566510 A | 9/2018 |
| CN | 108683795 A | 10/2018 |
| CN | 108989660 A | 12/2018 |
| CN | 109167894 A | 1/2019 |
| CN | 109388925 A | 2/2019 |
| CN | 103873652 B | 3/2019 |
| CN | 109639965 A | 4/2019 |
| TW | M417729 U1 | 12/2011 |
| TW | M436853 U1 | 9/2012 |
| TW | 201631954 A | 9/2016 |
| TW | 201702808 A | 1/2017 |

* cited by examiner

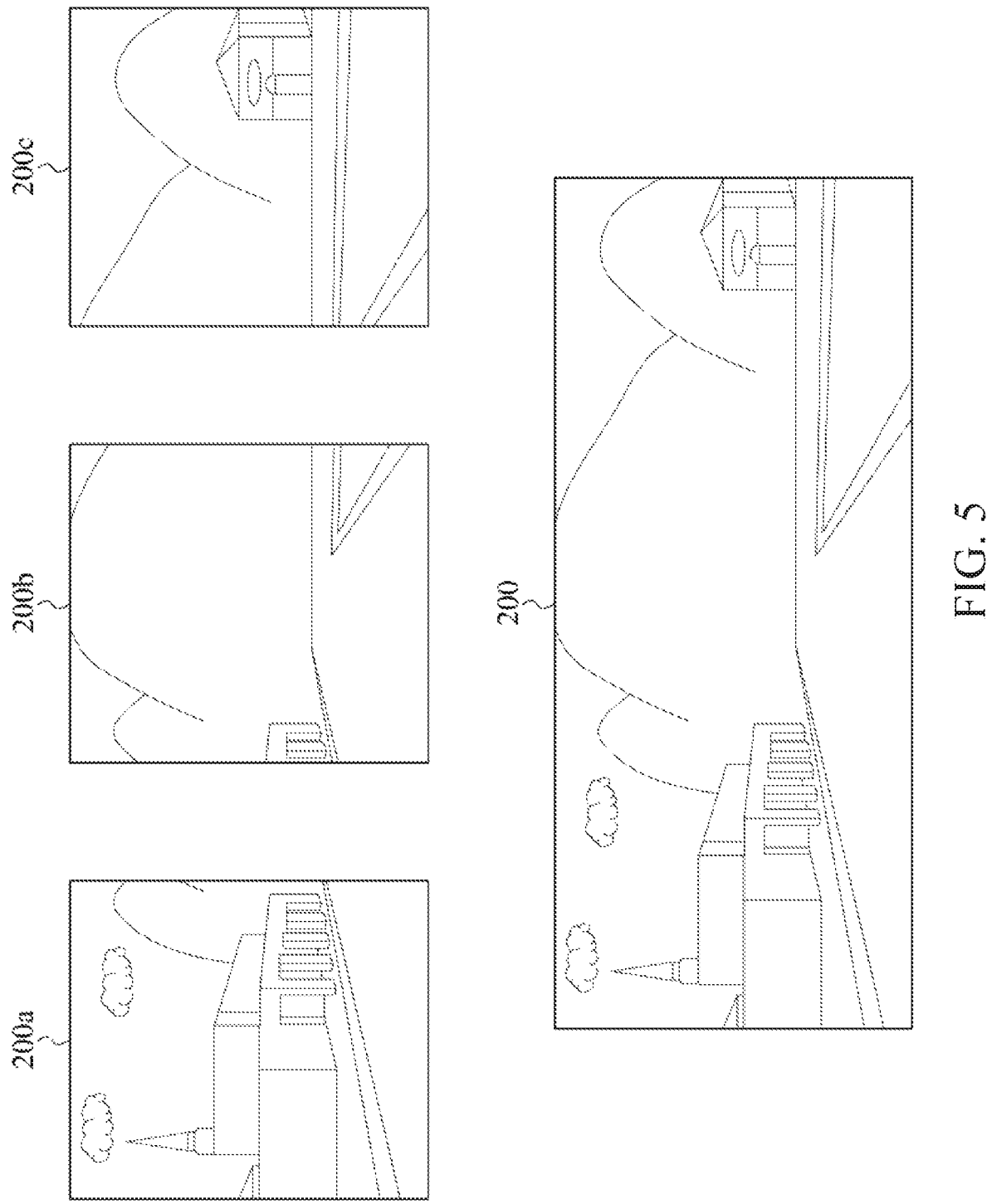

ELECTRONIC DEVICE

CROSS-REFERENCE TO RELATED APPLICATION

This application claims the priority benefit of Taiwan application serial No. 108136446 filed on Oct. 8, 2019, and U.S. provisional application Ser. No. 62/848,074 filed on May 15, 2019. The entirety of the above-mentioned patent application is hereby incorporated by reference herein and made a part of specification.

BACKGROUND OF THE INVENTION

Field of the Invention

The invention relates to an electronic device with an image capture device.

Description of the Related Art

The development of the electronic device is changing rapidly. For example, various components in smart phones are developed for more applications according to the needs and convenience for users. Thus, various designs of the related components are conducted in smart phones.

Based on the various designs of the components, the different operation method of the components are correspondingly introduced. For example, when a camera unit is no longer located at back of a smart phone, new operation scenarios for the camera unit is required for users to operate the various novel components more efficiently and conveniently.

BRIEF SUMMARY OF THE INVENTION

The disclosure provides an electronic device which reduces mis-operation and improves the user experience.

According to an aspect, an electronic device is provide. The electronic device includes: a body; an image capture device, rotatably disposed on the body, for capturing an image; a display, disposed on a first side of the body; a motor, electrically connected to the image capture device, for driving the image capture device to rotate with a flip angle and to locate at a first position, a second position, or a position between the first position and the second position; at least two sensors, respectively disposed on the image capture device and the body, for sensing the flip angle of the image capture device; and a processor, electrically connected to the image capture device, the display, the motor and the at least two sensors, and configured to control the motor.

In this disclosure, the electronic device according to the embodiments reduces mis-operation situation and improves the user experience.

These and other features, aspects and advantages of the present invention will become better understood with regard to the following description, appended claims, and accompanying drawings.

BRIEF DESCRIPTION OF THE DRAWINGS

FIG. 5 is a schematic image of a panoramic image according to an embodiment.

DETAILED DESCRIPTION OF THE EMBODIMENTS

In this article, when an element is called "connected" or "coupled", it can mean "electrically connected" or "electrically coupled". "Connected" or "coupled" can also be configured to indicate that two or more components operate together or interact with each other. In addition, although the terms "first", "second", . . . are used herein to describe different elements, the above terms are only configured to distinguish elements or operations described in the same technical term. Unless the context clearly indicates, the above terms are not specifically referred to or implied in order, nor are they configured to limit the invention.

Figure 2:
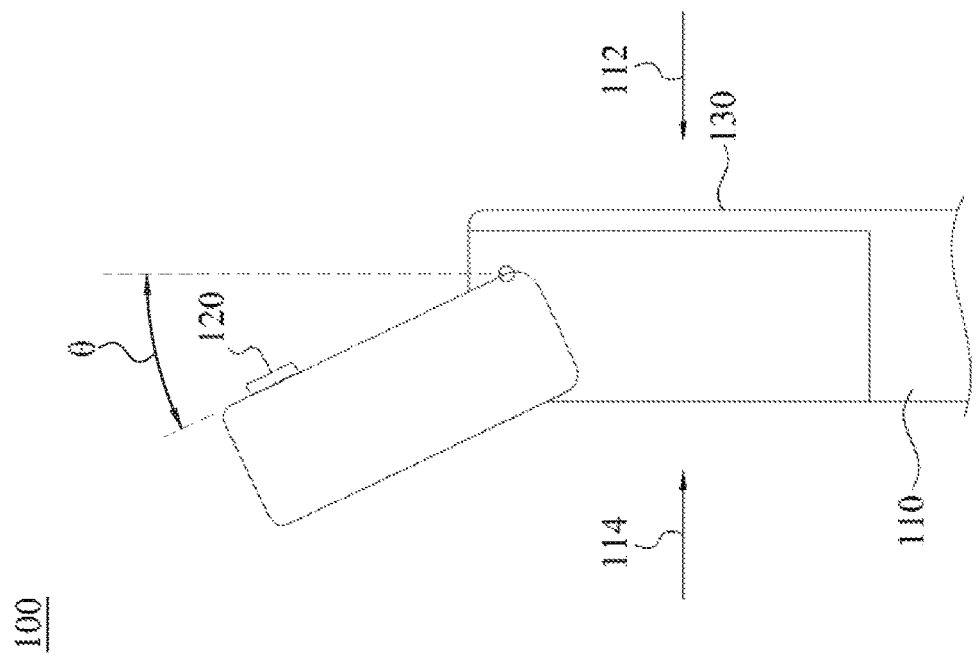
FIG. 2 is a schematic diagram of an electronic device according to an embodiment.
Figure 1:
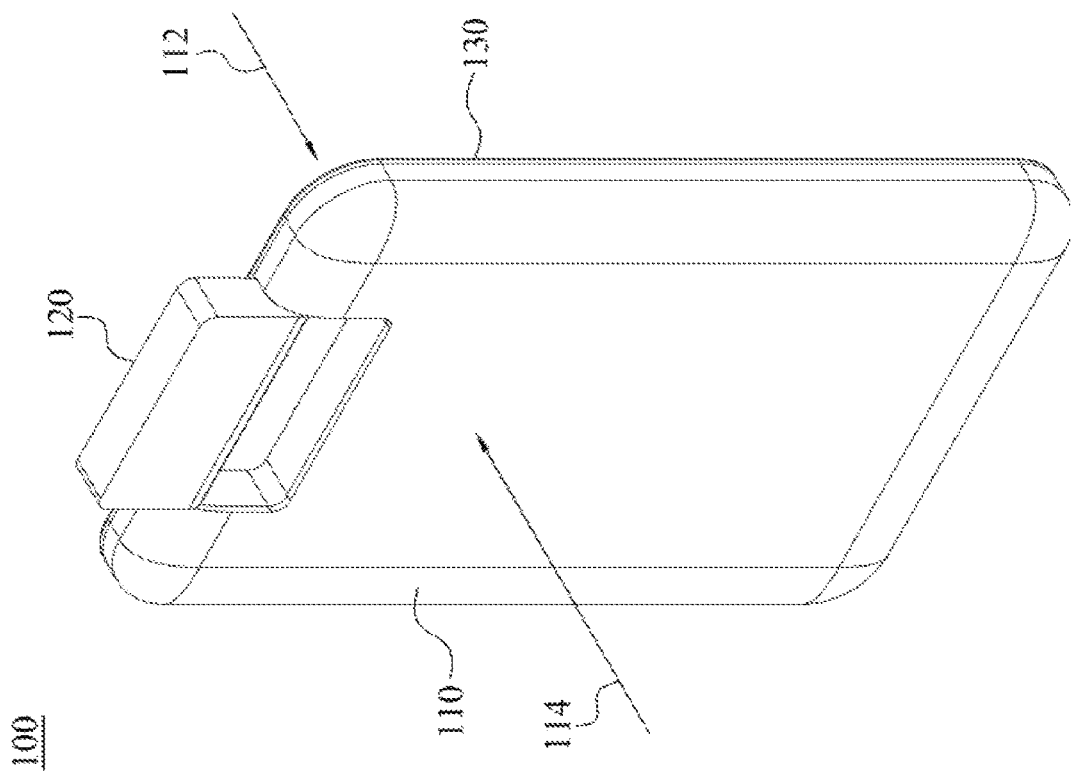
FIG. 1 is a schematic diagram of an electronic device according to an embodiment.
Figure 3:
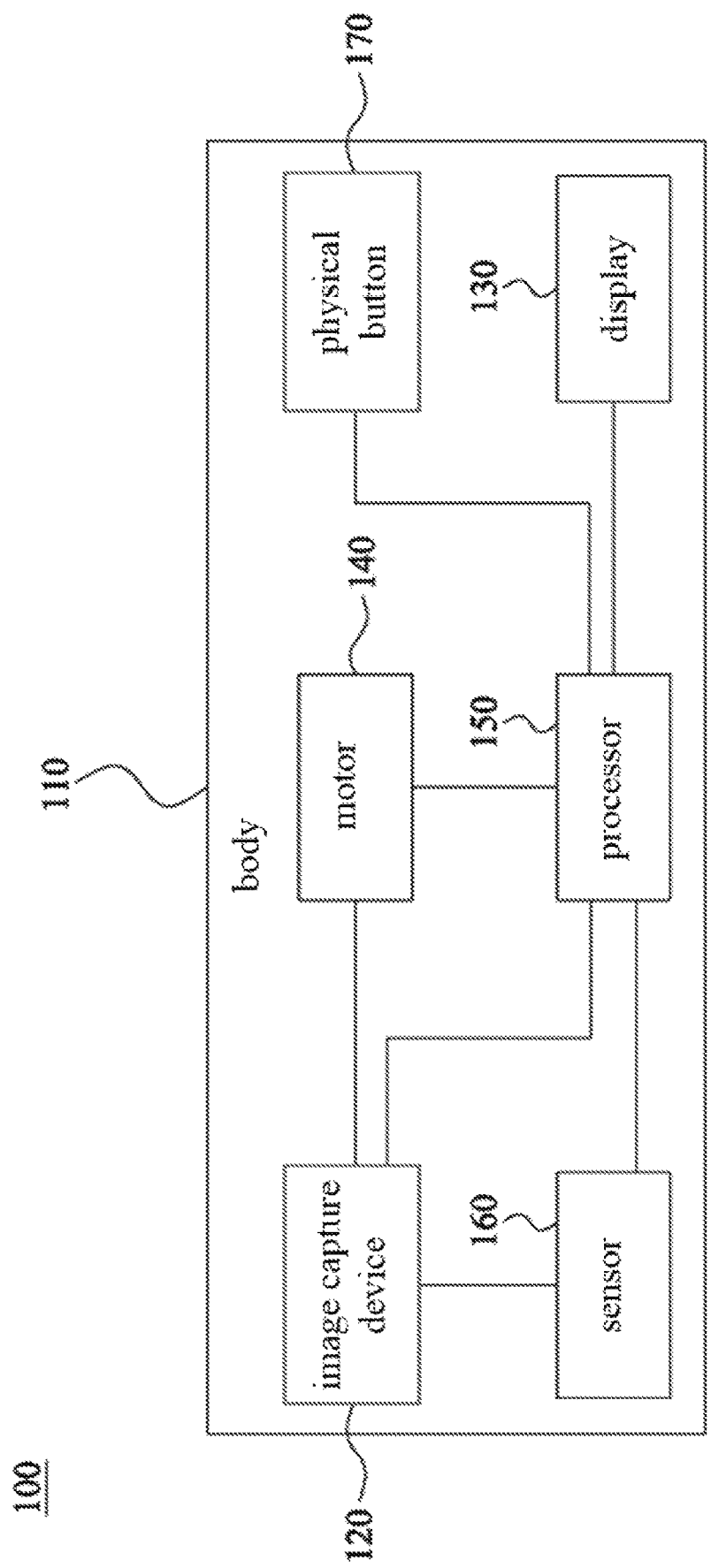
FIG. 3 is a functional block diagram of an electronic device according to an embodiment.

Please refer to FIG. 1, FIG. 2, and FIG. 3. An electronic device 100 includes a body 110, an image capture device 120, a display 130, a motor 140, a processor 150, and a sensor 160. The processor 150 is electrically connected to the image capture device 120, the display 130, the motor 140 and at least two sensors 160. The body 110 includes a first side 112 and a second side 114 opposite with each other. The image capture device 120 is rotatably disposed on the body 110 for capturing images. The display 130 is disposed on the first side 112 of the body 110. The display 130 is configured to display the image generated by the image capture device 120. The motor 140 is electrically connected to the image capture device 120 to drive the image capture device 120 to rotate with a flip angle θ. The processor 150 is configured to control the motor 140. In an embodiment, the two sensors 160 are respectively disposed on the body 110 and the image capture device 120 to obtain the flip angle θ of the image capture device 120.

In an embodiment, the electronic device 100 is a smart phone. In an embodiment, the image capture device 120 has a camera lens on a smart phone, and the display 130 is a mobile phone screen located on the front of the body 110. In an embodiment, the display 130 is LCD, LED, OLED, AMOLED or IPS, etc. which is not limited herein. In an embodiment, the motor 140 is a U-shaped motor, and the sensor 160 is a hall sensor, a distance sensor (P sensor), a gravity sensor (G sensor), or a gyroscope sensor (Gyro Sensor), which is not limited herein. In an embodiment, the image capture device 120 is a camera module with single lens or dual lens or multi lens, which is not limited herein.

In an embodiment, when the motor 140 drives the image capture device 120 to rotate with a flip angle θ, the image capture device 120 is positioned at a first position (such as a front lens position), at a second position (such as a rear lens position) or a position between the first position and the second position. In an embodiment, when the image capture device 120 is located at the second position (the rear lens position), the image capture device 120 is located at the second side 114 of the body 110. When the image capture device 120 is rotated 180° relative to the body 110, the image capture device 120 is located at the first position (the front lens position), and at this time, the image capture device 120 and the display 130 face the same direction.

In an embodiment, when the image capture device 120 is located at the front lens position (the first position) and the processor 150 receives an image capture function disable command, the processor 150 transmits a first motor control signal to the motor 140 to control the motor 140 to maintain the image capture device 120 at the front lens position for a preset time.

In an embodiment, when the image capture device 120 is maintained at the front lens position, the processor 150 determines whether the image capture device 120 needs to be used or not. When the processor 150 determines that the image capture device 120 needs to be used, the processor 150 transmits the first motor control signal to control the motor 140 to maintain the image capture device 120 at the front lens position. When the processor 150 determines that the image capture device 120 is not needed to be used, the processor 150 transmits a second motor control signal to the motor 140 to control the motor 140 to rotate the image capture device 120 to the rear lens position (the second position).

In one embodiment, the electronic device 100 already has an application using camera functions, such as the front lens function, and meanwhile another application is turned on, the processor 150 first receives a command to turn off the camera function. At this time, the processor 150 controls the motor 140 to maintain the image capture device 120 at the front lens position for a preset time without flipping back to the rear lens position. In this preset time, the processor 150 determines whether the other application needs to use the camera function or not. When the processor 150 determines that the application needs to use the camera function, the processor 150 transmits the first motor control signal to control the motor 140 to maintain the image capture device 120 at the front lens position. When the processor 150 determines that another application does not need to use the camera function, the processor 150 transmits the second motor control signal to control the motor 140 to rotate the image capture device 120 from the front lens position to the rear lens position.

In an embodiment, when the processor 150 receives a video notification and does not receive a video confirmation signal, the processor 150 controls the motor 140 not to rotate the image capture device 120. For example, when it receives the video notification of the application but does not receive a user confirmation to perform the video function, the electronic device 100 does not flip the image capture device 120, which avoids reducing the service life of the image capture device 120 due to flipping the image capture device 120 too frequently.

In one embodiment, when the display 130 is awakened, the electronic device 100 does not perform the face recognition function immediately. Until the display 130 is awakened and the processor 150 receives a specific control signal, the motor 140 is controlled to rotate the image capture device 120 to the front lens position according to the specific control signal to perform the face recognition function. In an embodiment, when the electronic device 100 receives the notification from the application and wakes up the display 130, it does not perform the face recognition function. Until the display 130 of the electronic device 100 receives a touch operation and transmits the specific control signal corresponding to the touch operation to the processor 150, the processor 150 controls the motor 140 to rotate the image capture device 120 to the front lens position according to the specific control signal to perform the face recognition function, which avoids frequently flipping the image capture device 120 due to waking up the display 130. In one embodiment, the touch operation is continuous taps on the display 130 or a finger sliding a certain distance or along a path on the display 130.

Please refer to FIG. 3. In an embodiment, the electronic device 100 further includes a physical button 170, and the physical button 170 is electrically connected to the processor 150. When the an image capture function of the image capture device 120 is activated, the processor 150 receives an adjustment signal from the physical button 170 and controls the motor 140 according to the adjustment signal to adjust the flip angle θ of the image capture device 120 relative to the body 110, which makes the image capture device 120 at the front lens position, the rear lens position, or the rest of the required flip angle θ. In one embodiment, the physical button 170 includes a volume up key and a volume down key. When the user presses the volume up key, the processor 150 controls the motor 140 to flip the image capture device 120 toward the front lens position according to the adjustment signal received from the volume up key. Similarly, when the user presses the volume down key, the processor 150 controls the motor 140 to flip the image capture device 120 towards the rear lens position according to the adjustment signal received from the volume down key.

In one embodiment, when the processor 150 repeatedly receives at least one of an enable image capture function command or a switch lens command over a reference times within a specific time, the processor 150 controls the motor 140 to stop rotating the image capture device 120 for a stop time, and controls the display 130 to display a warning message. For example, when the enable image capture function command or the switch lens command is received more than 3 times in 2 seconds, the electronic device 100 stops rotating the image capture device 120 for a stop time and controls the display 130 to display the warning message to inform the user that the lens cannot be switched at this time and please perform the lens switching function after a period of time.

Figure 4:
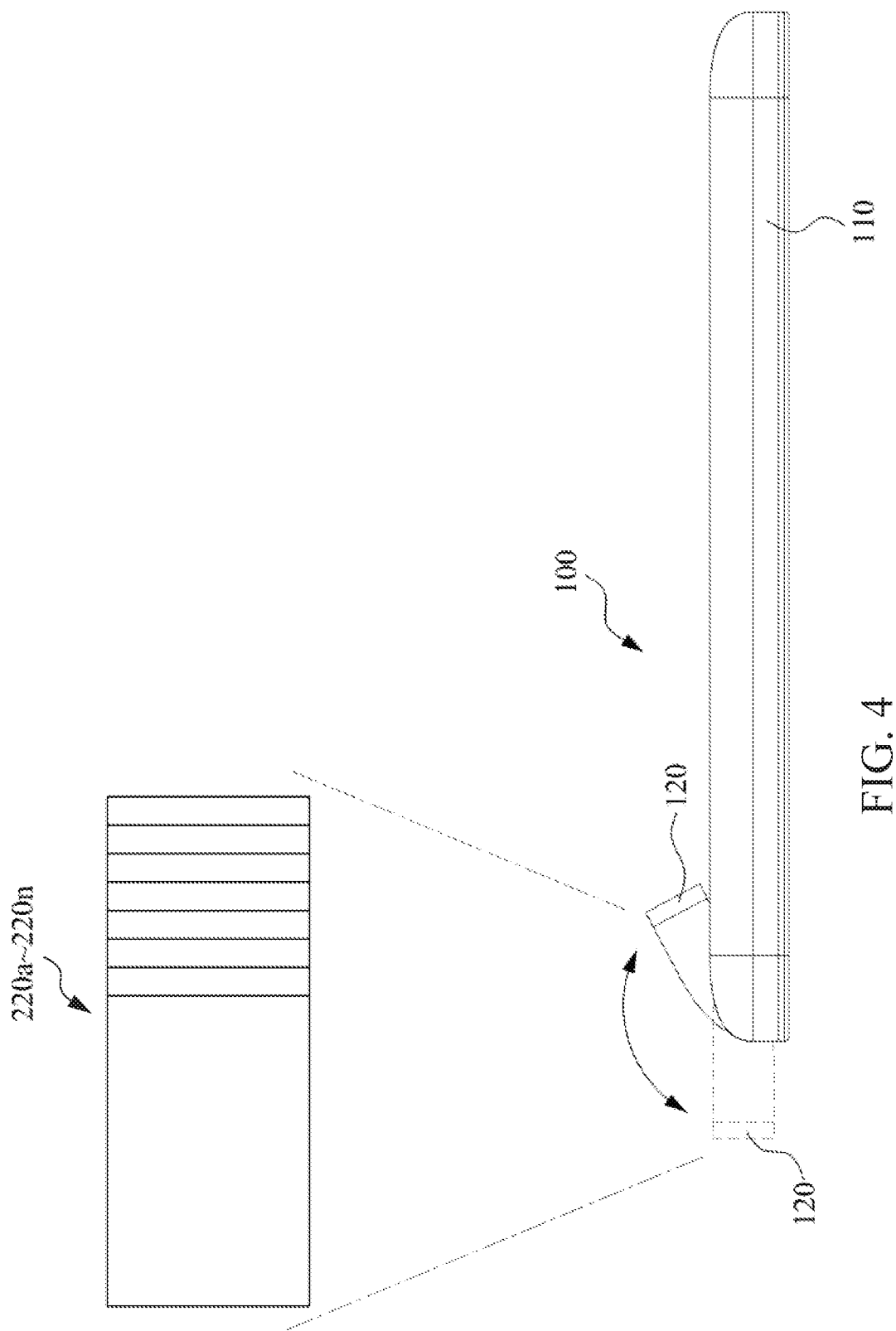
FIG. 4 is a schematic diagram of a panorama image mode according to an embodiment.

Please refer to FIG. 4. When the electronic device 100 operates in a panorama image mode, the processor 150 in the electronic device 100 controls the motor 140 to rotate the image capture device 120 to capture a plurality of panoramic segmented images 200a~200n, and splices the panoramic segmented images 200a~200n together to form a panoramic image 200. In an embodiment, a flipping angle range of the image capture device 120 is 0°~180°, and in the process of the image capture device 120 flipping from 0° to 180°, the image capture device 120 captures multiple panoramic segmented images 200a~200n. The number of the panoramic segmented images 200a~200n can be different according to the actual operation. Please refer to FIG. 5. In an embodiment, the panoramic image 200 includes the panoramic segmented image 200a, the panoramic segmented image 200b, and the panoramic segmented image 200c, and the number of the panoramic segmented images is not limited thereto.

Before splicing multiple the panoramic segmented images, the processor 150 confirms the flipping angle range of the image capture device 120, and then estimates a maximum splicing length of the panoramic image according to the flipping angle range. In one embodiment, when the electronic device 100 is operated in the panorama image mode, the processor 150 splices the panoramic segmented images captured by the image capture device 120 while the image capture device 120 captures the panoramic segmented images. When the total length of the panoramic segmented images that are spliced reaches the maximum splicing length of the panoramic image, the processor 150 stops the panorama image mode after a wait time. The wait time is not fixed and is changeable according to the flipping angle range of the image capture device 120 and the rotation performance of the motor 140.

In an embodiment, the processor 150 estimates an estimated total flipping time (such as 10.5 seconds) required by the motor 140 to turn the image capture device 120 from 0° to 180°, and the time taken by the motor 140 to actually turn the image capture device 120 from 0° to 180° is an actual total flipping time (for example, 9 seconds). When the total length of the panoramic segmented images that are spliced reaches the maximum splicing length of the panoramic image, the processor 150 waits for 1.5 seconds (that is, the wait time is 1.5 seconds) and then stops the panorama image mode, that is, the wait time is the absolute value of the difference between the estimated total flipping time and the actual total flipping time. In an embodiment, the estimated total flipping time is the average of the total length of time required for the motor 140 of the same type to rotate the image capture device 120 from 0° to 180° plus the length of the buffer time.

In an embodiment, the flipping angle range of the image capture device 120 is 0°~180°. When the flip angle of the image capture device 120 reaches the upper limit of the flipping angle range (for example: the flip angle has reached 180°), the processor 150 stops the panorama image mode. In an embodiment, when the flip angle of the image capture device 120 reaches the upper limit of the flipping angle range, even if the total length of the spliced panoramic segmented images at that time did not reach the maximum splicing length of the panoramic image, the processor 150 stops the panorama image mode.

During the splicing process, the motor 140 uses a low constant speed rotation method to flip the image capture device 120 at a constant speed. The image capture device 120 continuously captures the panoramic segmented images while flipping, and then the processor 150 splices the panoramic segmented images captured by the ArcSoft Library algorithm.

In an embodiment, when the electronic device 100 operates in the panorama image mode, if the processor 150 determines that the image content difference between the adjacent panoramic segmented images is greater than an error condition, the processor 150 stops the panorama image mode. In an embodiment, when the difference in colors, objects, or scenes in the adjacent panoramic segmented images is greater than the error condition, the processor 150 stops the panorama image mode. For example, the image content of the panoramic segmented image 200b deviates from the image centerline, causing the image content of the panoramic segmented image 200b to be too different from the image content of the panoramic segmented image 200a. Therefore, the processor 150 stops the panorama image mode in advance.

In summary, the electronic device of the embodiments determines whether to rotate the image capture device according to different usage scenarios, so as to prevent the service life of the image capture device reduces due to frequent rotation. The image capture device rotates only when it is determined that the image capture device needs to be used, which greatly reduces the mis-operation situation and improves the user experience.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
    a body;
    an image capture device, rotatably disposed on the body, for capturing an image;
    a display, disposed on a first side of the body;
    a motor, electrically connected to the image capture device, for driving the image capture device to rotate with a flip angle to make the image capture device to be located at a first position, a second position, or a position between the first position and the second position;
    at least two sensors, respectively disposed on the image capture device and the body, for sensing the flip angle of the image capture device; and
    a processor, electrically connected to the image capture device, the display, the motor and the at least two sensors, and configured to control the motor, when the image capture device is in the first position and the processor receives an image capture function disable command, the processor transmits a first motor control signal to the motor to control the motor to maintain the image capture device at the first position for a preset time.

2. The electronic device according to claim 1, when the image capture device is maintained at the first position, the processor determines whether the image capture device needs to be used or not, and when the processor determines that the image capture device does not need to use, the processor transmits a second motor control signal to the motor to control the motor to rotate the image capture device to the second position.

3. The electronic device according to claim 1, when the processor receives a video notification and does not receive a video confirmation signal, the processor controls the motor not to rotate the image capture device.

4. The electronic device according to claim 1, when the display is awakened and the display receives a specific control signal, the processor controls the motor to rotate the image capture device to the first position.

5. The electronic device according to claim 1, further comprising:
    a physical button, electrically connected to the processor, wherein, when an image capture function of the image capture device is enabled, the processor receives an adjustment signal from the physical button and controls the motor according to the adjustment signal to adjust the flip angle of the image capture device.

6. The electronic device according to claim 1, when the processor repeatedly receives an enable image capture function command or a switch lens command over a reference times within a specific time, the processor controls the motor to stop turning the image capture device for a stop time, and controls the display to display a warning message.

7. The electronic device according to claim 1, when the electronic device operates in a panorama image mode, the processor controls the motor to rotate the image capture device to capture a panoramic image, wherein the panoramic image is generated by splicing a plurality of panoramic segmented images.

8. The electronic device according to claim 7, when the electronic device operates in the panorama image mode, the processor determines a flipping angle range of the image capture device, and estimates a maximum splicing length of the panoramic image based on the flipping angle range, and when the total length of the spliced the panoramic segmented images reaches the maximum splicing length of the panoramic image, the processor stops the panorama image mode after a wait time.

9. The electronic device according to claim 7, when the electronic device operates in the panorama image mode, the processor confirms a flipping angle range of the image capture device, and when the flip angle of the image capture device reaches an upper limit of the flipping angle range, the processor waits for a wait time and then stops the panorama image mode.

10. The electronic device according to claim 9, the wait time is changeable according to the flipping angle range of the image capture device and the rotation performance of the motor.

11. The electronic device according to claim 7, when the electronic device operates in the panorama image mode, if the processor determines that an image content difference between the panoramic segmented images that are adjacent with each other is greater than an error condition, the processor stops the panorama image mode.

12. An electronic device, comprising:
a body;
an image capture device, rotatably disposed on the body, for capturing an image;
a display, disposed on a first side of the body;
a motor, electrically connected to the image capture device, for driving the image capture device to rotate with a flip angle to make the image capture device to be located at a first position, a second position, or a position between the first position and the second position;
at least two sensors, respectively disposed on the image capture device and the body, for sensing the flip angle of the image capture device; and
a processor, electrically connected to the image capture device, the display, the motor and the at least two sensors, and configured to control the motor, when the display is awakened and the display receives a specific control signal, the processor controls the motor to rotate the image capture device to the first position.

13. An electronic device, comprising:
a body;
an image capture device, rotatably disposed on the body, for capturing an image;
a display, disposed on a first side of the body;
a motor, electrically connected to the image capture device, for driving the image capture device to rotate with a flip angle to make the image capture device to be located at a first position, a second position, or a position between the first position and the second position;
at least two sensors, respectively disposed on the image capture device and the body, for sensing the flip angle of the image capture device; and
a processor, electrically connected to the image capture device, the display, the motor and the at least two sensors, and configured to control the motor, when the processor repeatedly receives an enable image capture function command or a switch lens command over a reference times within a specific time, the processor controls the motor to stop turning the image capture device for a stop time, and controls the display to display a warning message.

* * * * *